June 30, 1953  E. C. KIEKHAEFER  2,643,510
INTERNAL-COMBUSTION ENGINE
Filed Sept. 23, 1949  3 Sheets-Sheet 1

INVENTOR.
Elmer C. Kiekhaefer
BY Andrus & Keesler
ATTORNEYS

June 30, 1953  E. C. KIEKHAEFER  2,643,510
INTERNAL-COMBUSTION ENGINE
Filed Sept. 23, 1949  3 Sheets-Sheet 2
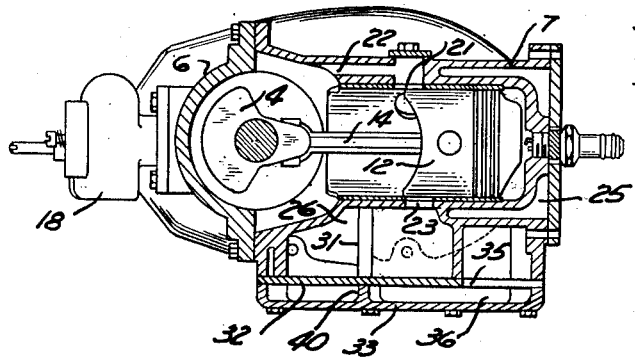
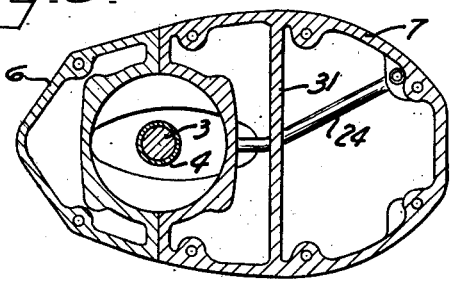
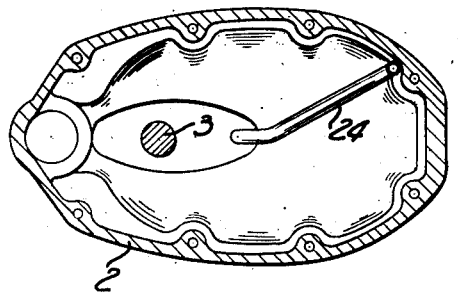
INVENTOR.
Elmer C. Kiekhaefer
BY
Andrus & Stealer
ATTORNEYS.

June 30, 1953 — E. C. KIEKHAEFER — 2,643,510
INTERNAL-COMBUSTION ENGINE
Filed Sept. 23, 1949 — 3 Sheets-Sheet 3

INVENTOR.
Elmer C. Kiekhaefer
BY
Andrus & Scealer
ATTORNEYS

Patented June 30, 1953

2,643,510

UNITED STATES PATENT OFFICE 2,643,510

INTERNAL-COMBUSTION ENGINE

Elmer C. Kiekhaefer, Cedarburg, Wis.

Application September 23, 1949, Serial No. 117,326

3 Claims. (Cl. 60—32)

This invention relates to internal combustion engines and particularly to the exhaust manifolding of engines of multiple cylinders firing successively.

The invention provides in the engine cylinder block, separate cooling and channeling of the exhaust of groups of cylinders according to their firing order so that interference between cylinders having overlapping exhaust cycles is avoided and maximum cooling is afforded by the means provided.

An object of the invention is to provide separate exhaust chambers within the engine block which will eliminate interference between cylinders.

Another object of the invention is to eliminate interference between cylinders having overlapping exhaust cycles without requiring two or more duplicate exhaust discharge means to be connected to the engine block.

Another object of the invention is to utilize the maximum capacity of a single exhaust discharge system to receive the exhaust from two or more chambers separately formed in the block and receiving the exhaust from corresponding groups of cylinders without overlapping exhaust cycles.

Another object is to obtain maximum heat transfer of the exhaust cooling system particularly in an engine having cylinders firing successively and with overlapping exhaust cycles.

These and other objects and advantages will be set forth in the following description of a preferred embodiment of the invention as illustrated in the accompanying drawings.

In the drawings:

Fig. 2 is a horizontal section taken on line 2—2 of Fig. 1;

Fig. 3 is a horizontal section taken on line 3—3 of Fig. 1 near the lower end of the cylinder block;

Fig. 4 is a view similar to Fig. 3 taken on line 4—4 of Fig. 1 near the upper end of the housing supporting the engine block and receiving the exhaust therefrom;

Figure 1:
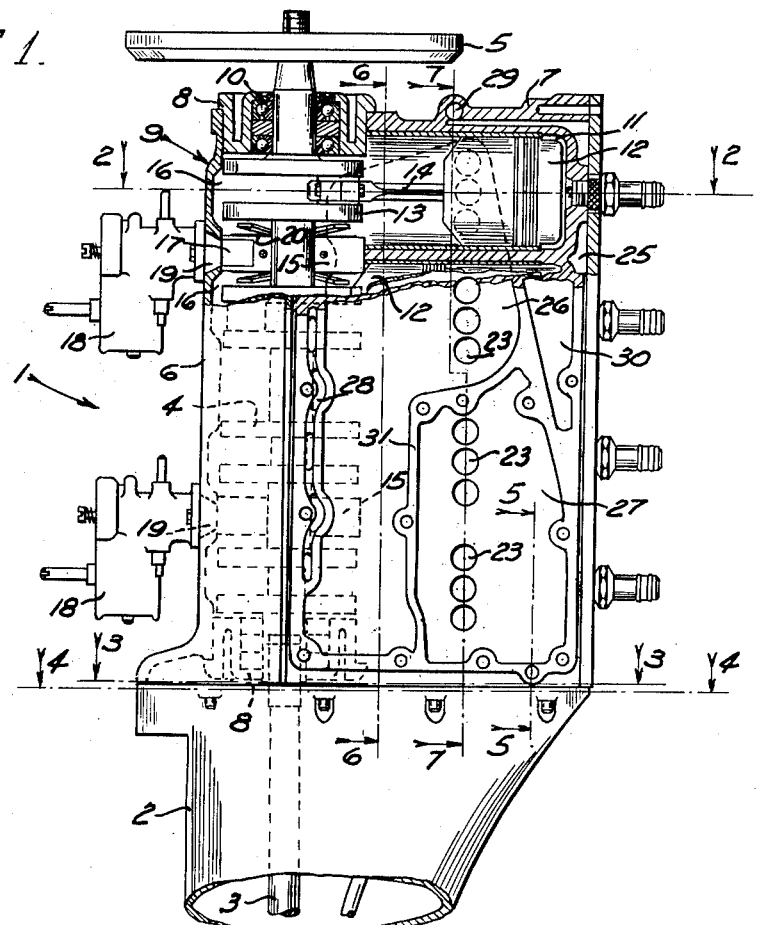
Figure 1 is a side elevation of a four-cylinder, two-cycle internal combustion engine with the upper portion thereof broken away and sectioned and with the exhaust port plate removed from the cylinder block to show two separate exhaust chambers formed therein.
Figure 5:
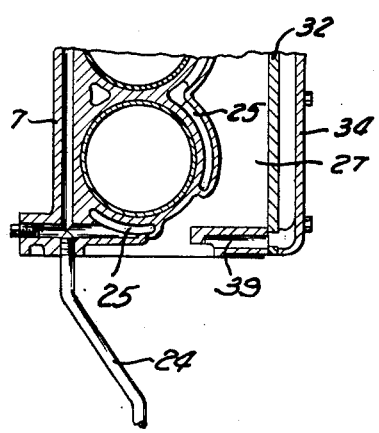
Fig. 5 is a vertical transverse section taken on line 5—5 of Fig. 1 through the engine block.
Figure 6:
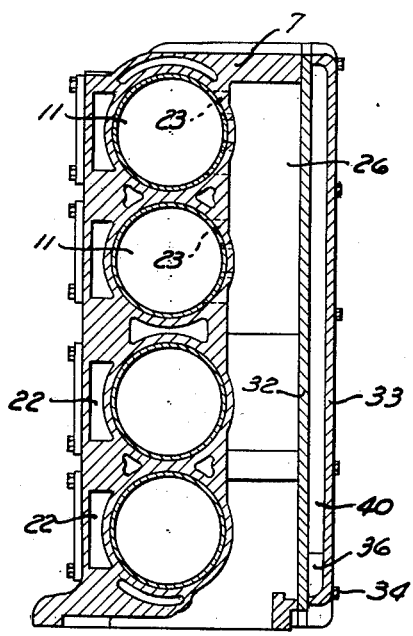
Fig. 6 is a transverse vertical section taken on lines 6—6 of Fig. 1.
Figure 7:
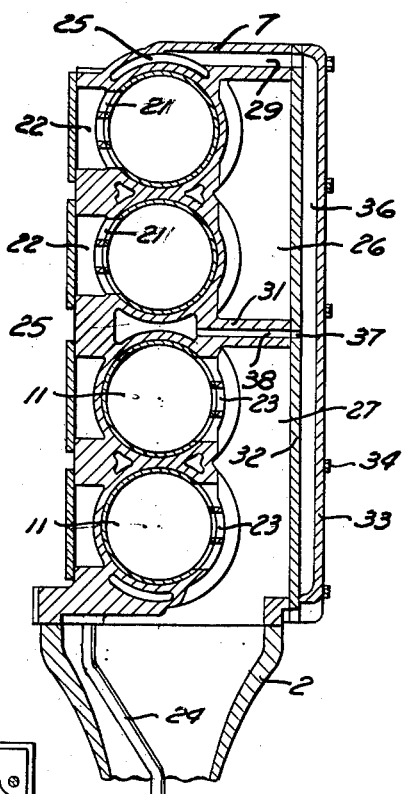
Fig. 7 is a vertical transverse section taken on line 7—7 of Fig. 1.
Figure 8:
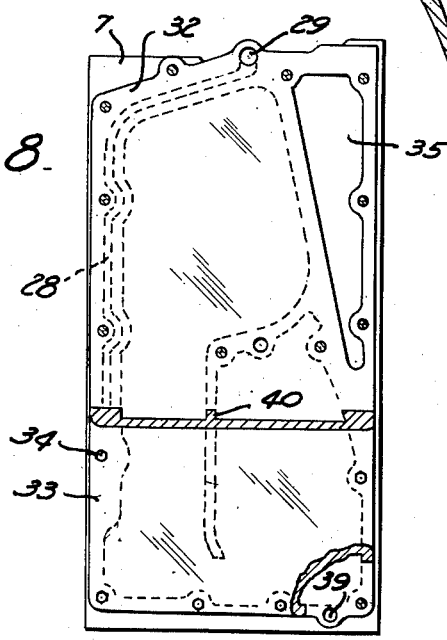
Fig. 8 is a side elevation of the engine block with a portion of the cover broken away and sectioned to show the cover plate closing the exhaust chambers.

The two-cycle engine 1 shown in the drawings is adapted to be supported upon the drive shaft housing 2 of an outboard motor and to drive the propeller of the motor, not shown, through the drive shaft 3 extending downwardly from the engine through the housing. The vertically disposed crankshaft 4 of engine 1 projects downwardly toward the upper open end of housing 2 and is directly connected to drive shaft 3. The flywheel 5 is carried by the upper end of crankshaft 4 above the engine.

The crankcase member 6 is forwardly joined to the engine block 7 and the upper and lower closure members 8 comprise the crankcase 9 which encloses and supports crankshaft 4 in the bearings 10. Engine block 7 is provided with the four cylinders 11 which open forwardly into crankcase 9 and carry the pistons 12 connected to the respective cranks 13 of crankshaft 4 by the connecting rods 14.

Upper and lower bearing members 15 and a center bearing, not shown, assembled on crankshaft 4 are disposed within crankcase 9 to divide the latter into individual, separate chambers 16 for each of cranks 13. The upper and lowermost members 15 are provided with fuel induction passages 17 which open upwardly and downwardly into the respective chambers 16 and communicate with the respective carburetor 18 carried by crankcase member 6 to receive the fuel mixture therefrom through the port openings 19 in member 6 carrying the carburetors.

The valves 20 are disposed to control the opening and closing of passages 17 in synchronism with the two-cycle operation of the engine. Valves 20 are opened accordingly, for the induction of fuel into the respective chamber 16 from carburetor 18 with each upstroke of the corresponding piston 12 and are closed during each down-stroke of the piston in effecting a precompression of the fuel charge in the chamber.

The intake ports 21 of each cylinder 11 open into transfer passages 22 formed in the side of block 7 and which extend forwardly into the corresponding respective crank chambers 16.

Ports 21 are uncovered and opened by pistons 12 at the lower end of each stroke of the piston to allow the pre-compressed fuel charge in the respective crank chamber 16 to be transferred through passage 22 and admitted into the corresponding cylinder 11.

The ports 23 of each cylinder 11 are disposed oppositely of ports 21 and are uncovered and opened by pistons 12 at the lower end of each stroke to provide for exhaust of the cylinders and the scavenging and recharging of the cylinders by the precompressed fuel mixture entering the cylinders through ports 21 as described above.

The pipe 24 is connected to water circulating means, not shown, which is preferably to be operated by engine 1. Pipe 24 extends upwardly within housing 2 and is connected at the underside of block 7 to the cored water circulating passages 25 formed in block 7 adjacent cylinders 12 to provide a water coolant jacket for the cylinders.

The water-cooled expansion chambers 26 and 27 into which exhaust ports 23 of the cylinders open, as will be described, comprise adjacent recesses formed in the side of block 7 overlying cylinders 11 and opening downwardly of block 7. The narrow recess 28 in the side of block 7 forwardly of chambers 26 and 27 and adjacent the forward edge of the block and crankcase 9 communicates with each of passages 25 to receive coolant water therefrom and extends upwardly to the drilled passage 29 which communicates with the uppermost of passages 25. The recess 30 is formed adjacent and rearwardly of chambers 26 and 27 and is adapted to receive water coolant, as will be described.

Chambers 26 and 27 are dimensioned and disposed with respect to ports 23 according to the firing order of cylinders 11 and the exhaust cycles of the cylinders so that each chamber receives an exhaust discharge from the respective cylinders at regular intervals and a constant, even flow of exhaust through the chambers is obtained.

Where the exhaust periods overlap as in engine 1 by reason of the fact that the firing of the four cylinders 11 are spaced 90° with respect to the rotation of crankshaft 4 while the exhaust periods are protracted slightly more than 90°, interference of the cylinder commencing an exhaust period with the cylinder completing an exhaust period is prevented by the wall 31 of block 7 which separates chambers 26 and 27 and extends fully to the lower dimension of the block.

The plate 32 is secured over recesses 26 and 27 by the cover 33 secured to block 7 by the bolts 34. Plate 32 closes chambers 26 and 27 and recess 28 and is provided with an opening 35 registering with recess 30. The recess 36 provided in cover 33 facing block 7 is substantially of the same dimensions as that of chambers 26 and 27 and recess 30 which latter communicates with recess 36 through opening 35. Water is admitted for cooling of the exhaust in chambers 26 and 27 to recesses 36 and 30 from passages 25 through openings 37 in plate 32 registering with passages 29 and 38. The passage 39 from the lower end of recess 36 through plate 32 and block 7 opens into the upper end of housing 2 for discharge with the water. The inner wall 40 formed integrally with cover 33 is disposed to provide for the even circulation of water through recess 36 between openings 37 and passage 39.

The exhaust entering chambers 26 and 27 is cooled by the water coolant circulating through the passages, as described, with greater efficiency by reason of the more uniform flow of gases over the cooling areas of block 7 and plate 32. Interference between the overlapping exhaust of successively firing cylinders is eliminated by reason of the separate chambers opening into housing 2.

The chamber openings from block 7 into housing 2 are adjacent each other. The exhaust gases travel contiguously from chambers in parallel downward streams which alternately pass each other in housing 2 at substantial velocities with each exhaust discharge. Following Bernoulli's principle, this velocity causes a reduced pressure and the gas stream moving at the higher velocity from one chamber tends to carry therewith the gases of the adjacent stream and to evacuate the adjacent chamber just prior to the next succeeding exhaust discharge of the engine into the adjacent chamber.

The disposition of chambers 26 and 27 is determined by the firing order of the cylinders, as described. More than two chambers arranged for single or groups of cylinders other than as described may also be employed.

Various embodiments of the invention may be employed within the scope of the accompanying claims.

I claim:

1. A two-cycle engine, comprising a crankshaft and a plurality of pistons connected thereto for reciprocation with rotation of the crankshaft, a cylinder block having a cylinder for each of said pistons and exhaust ports from each of said cylinders, said engine having a number of pistons and cylinders firing in consecutive order with rotation of said crankshaft and having the exhaust ports of each cylinder disposed to open for an exhaust period which coincides in part with the opening period of the ports of another cylinder, separate adjacent chambers formed in said block and each having the respective ports of a corresponding group of cylinders opening thereinto, said groups of cylinders having alternate exhaust periods and said block having separate adjacent discharge openings for each of said chambers, and opening in the same direction, and an exhaust conduit disposed and connected to said block to receive and conduct parallel contiguous streams of the alternate discharges of exhaust gases from said chambers whereby the higher velocity exhaust discharge from one chamber effects an evacuation of the other chamber of exhaust gases remaining therein.

2. The invention as recited in claim 1 wherein the exhaust conduit comprises an outboard motor drive shaft housing connected to and supporting the engine on the upper end of the housing and having a lower opening for the underwater discharge of the exhaust gases from both of said chambers of the engine.

3. The invention as recited in claim 1 wherein the engine cylinders firing consecutively have exhaust periods which overlap and the separate chambers prevent interference of an exhaust discharge from a first cylinder with the next preceding exhaust discharge of a second cylinder and the effect of the exhaust gases of said first cylinder discharged from the corresponding chamber upon the evacuation of the other chamber coincides with the exhaust period of a third cylinder exhausting into said other chamber.

ELMER C. KIEKHAEFER.

References Cited in the file of this patent

UNITED STATES PATENTS

| Number | Name | Date |
|---|---|---|
| 976,610 | Shultz | Nov. 22, 1910 |
| 1,968,110 | Walker | July 31, 1934 |
| 2,003,485 | Gehres | June 4, 1935 |
| 2,209,301 | Johnson et al. | July 23, 1940 |
| 2,227,247 | Conover | Dec. 31, 1940 |
| 2,504,973 | Gehres | Apr. 25, 1950 |